(12) United States Patent
Tanaka et al.

(10) Patent No.: US 12,436,100 B2
(45) Date of Patent: Oct. 7, 2025

(54) MOISTURE SENSOR AND IMAGE FORMING APPARATUS

(71) Applicant: CANON KABUSHIKI KAISHA, Tokyo (JP)

(72) Inventors: Yuki Tanaka, Chiba (JP); Ryuichi Araki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 52 days.

(21) Appl. No.: 18/312,634

(22) Filed: May 5, 2023

(65) Prior Publication Data

US 2023/0375471 A1 Nov. 23, 2023

(30) Foreign Application Priority Data

May 18, 2022 (JP) ................................. 2022-081724

(51) Int. Cl.
| | | |
|---|---|---|
| *G01N 21/3559* | (2014.01) | |
| *G03G 15/00* | (2006.01) | |
| *G03G 15/16* | (2006.01) | |
| *G03G 21/20* | (2006.01) | |

(52) U.S. Cl.
CPC ..... *G01N 21/3559* (2013.01); *G03G 15/1665* (2013.01); *G03G 15/5029* (2013.01); *G03G 15/5062* (2013.01); *G03G 21/20* (2013.01); *G01N 2201/0636* (2013.01); *G03G 2215/00776* (2013.01)

(58) Field of Classification Search
CPC ............... G03G 15/1665; G03G 21/20; G03G 15/5029; G03G 15/5062; G03G 2215/00776; G01N 21/3559; G01N 2201/0636
See application file for complete search history.

(56) References Cited

U.S. PATENT DOCUMENTS

| | | |
|---|---|---|
| 4,171,918 A | 10/1979 | MacTaggart |
| 4,766,315 A | 8/1988 | Hellstrom et al. |
| 5,414,503 A | 5/1995 | Siegel et al. |
| 8,750,732 B2 * | 6/2014 | Ishii .................. G01N 21/21 356/450 |
| 9,157,853 B2 | 10/2015 | Ishii et al. |

(Continued)

FOREIGN PATENT DOCUMENTS

| | | |
|---|---|---|
| CN | 104053975 A | 9/2014 |
| EA | 032591 B1 | 6/2019 |
| JP | S6161623 A | 3/1986 |

(Continued)

OTHER PUBLICATIONS

Extended European search report issued in European Appln. No. 23171243.1, mailed on Sep. 29, 2023.

*Primary Examiner* — Joseph S Wong
(74) *Attorney, Agent, or Firm* — ROSSI, KIMMS & McDOWELL LLP

(57) ABSTRACT

A moisture sensor detects moisture in an object. A first light-emitting element emits light. A first reflecting member reflects light reflected from the object toward the object. A light-receiving element receives light that is multiple reflected between the object and the first reflecting member. A controller determines an amount of moisture in the object based on a light reception result from the light-receiving element.

18 Claims, 13 Drawing Sheets

(56) References Cited

U.S. PATENT DOCUMENTS

2013/0148107 A1 6/2013 Tixier et al.
2019/0162672 A1* 5/2019 Sakakibara ............ G01N 21/31

FOREIGN PATENT DOCUMENTS

| JP | H023308 A | 1/1990 |
| JP | 2005164303 A | 6/2005 |
| JP | 2013057513 A | 3/2013 |

* cited by examiner

1110

| ADDR | DATA |
|------|------|
| 001  | 2530 |
| 002  | 2510 |
| 003  | 2570 |
| ⋮    | ⋮    |
| 500  | 2520 |

| ADDR | DATA |
|------|------|
| 1001 | 2410 |
| 1002 | 2450 |
| 1003 | 2370 |
| ⋮    | ⋮    |
| 1500 | 2400 |

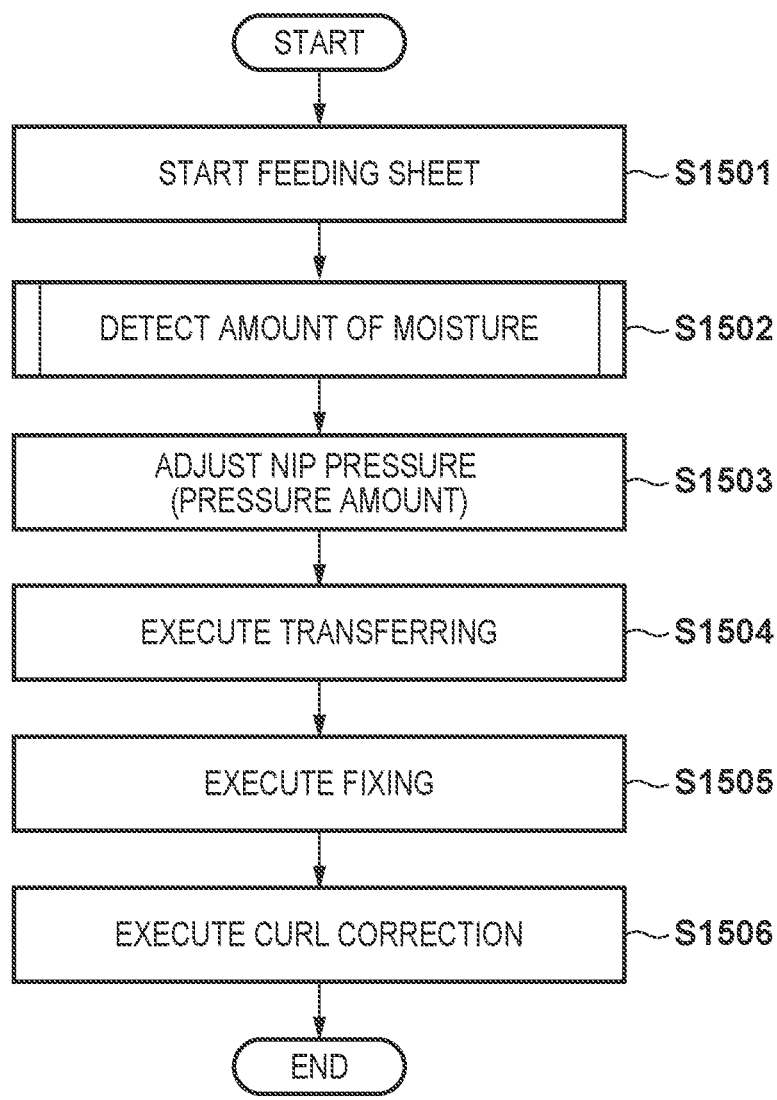

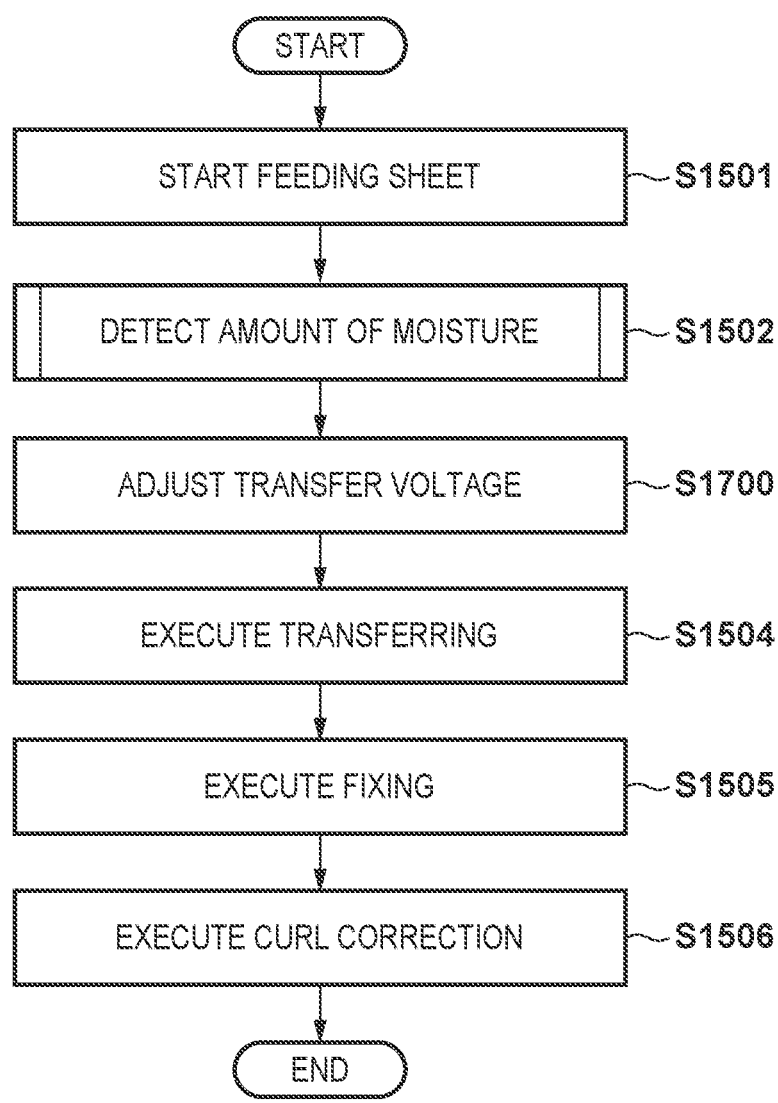

MOISTURE SENSOR AND IMAGE FORMING APPARATUS

BACKGROUND OF THE INVENTION

Field of the Invention

The present disclosure relates to an image forming apparatus and a moisture sensor that detect an amount of moisture.

Description of the Related Art

A moisture sensor that detects the amount of moisture in a measurement subject in order to control an electronic device using the amount of moisture has been proposed. Japanese Patent Publication No. 61-61623 describes a moisture measurement apparatus that irradiates a measurement subject with light output from a light source through a wavelength filter and focuses and receives the resulting transmitted light or reflected light. In this invention, light at a wavelength that is most easily absorbed by moisture is extracted from the light emitted from the light source by the wavelength filter. Japanese Patent Laid-Open No. 2013-57513 discloses a moisture sensor using, as a light source, a light-emitting diode (LED) that emits light at a wavelength that is absorbed by moisture.

The conventional configurations have not been able to detect minute changes in the amount of moisture in a sheet with high accuracy. This is because of the amount of reflected light from the sheet that is received by an optical sensor, changes in the amount of light caused by changes in the amount of moisture in the sheet are small to begin with. Accordingly, an object of the present invention is to detect minute changes in the amount of moisture in a sheet with greater accuracy than in the past.

SUMMARY OF THE INVENTION

The present disclosure provides a moisture sensor that detects moisture in an object, the moisture sensor comprising: a first light-emitting element configured to emit light; a first reflecting member configured to reflect light reflected from the object toward the object; a light-receiving element configured to receive light that is multiple reflected between the object and the first reflecting member; and a controller configured to determine an amount of moisture in the object based on a light reception result from the light-receiving element.

Further features of the present invention will become apparent from the following description of exemplary embodiments (with reference to the attached drawings).

BRIEF DESCRIPTION OF THE DRAWINGS

FIG. 15 is a flowchart illustrating a decurler adjustment method.

FIG. 17 is a flowchart illustrating a secondary transfer voltage adjustment method.

DESCRIPTION OF THE EMBODIMENTS

Figure 1:
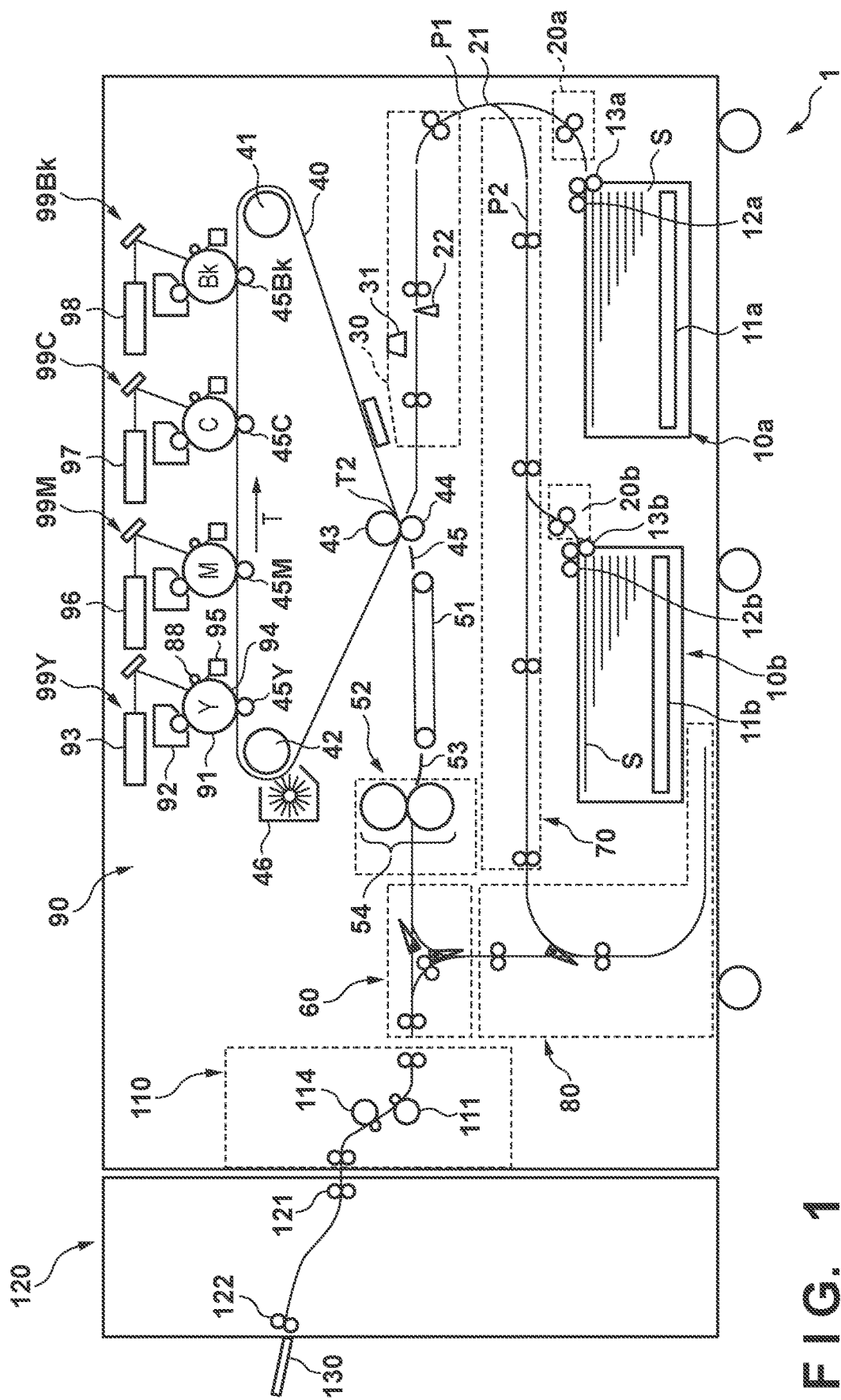
FIG. 1 is a diagram illustrating an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Image Forming Apparatus

FIG. 1 is a diagram illustrating an image forming apparatus 1 in which a moisture sensor can be provided. Feed units 10a and 10b are devices that hold a plurality of sheets S and feed the sheets S. Pullout units 20a and 20b are devices that pull the sheets S from the feed units 10a and 10b, respectively, and transport the sheets S. A registration unit 30 adjusts the timings of the sheet S and toner images. A moisture sensor 31 is provided in the registration unit 30, and detects an amount of moisture in the sheet S. A sheet sensor 22 is provided upstream from the moisture sensor 31 in a transport direction of the sheet S, and senses the passage of the sheet S.

An image forming unit 90 forms a toner image on the sheet S. A fixer 52 fixes the toner image onto the sheet S. Transport units 60, 70, and 80 transport the sheet S. A decurler 110 reduces warping (curling) of the sheet S caused by moisture in the sheet S evaporating when the sheet S passes through the fixer 52.

The feed unit 10a includes a lift plate 11a that ascends and descends while holding a stack of the sheets S, a pick-up roller 12a that feeds the sheets S stacked on the lift plate 11a, and a separation roller pair 13a that separates the fed sheets one at a time. Similarly, the feed unit 10b includes a lift plate 11b that ascends and descends while holding a stack of the sheets S, a pick-up roller 12b that feeds the sheets S stacked on the lift plate 11b, and a separation roller pair 13b that separates the fed sheets one at a time.

As illustrated in FIG. 1, the image forming unit 90 has four process cartridges 99Y, 99M, 99C, and 99Bk that form a toner image having four colors, such as yellow "Y", magenta "M", cyan "C", and black "K (Bk)", respectively. The image forming unit 90 includes exposure devices 93, 96, 97, and 98 for forming electrostatic latent images.

The process cartridges 99Y, 99M, 99C, and 99Bk have the same structure aside from the colors of the toner images being different. Accordingly, the structure of the process cartridge 99Y and the image forming process thereof will be described as a representative example.

The process cartridge 99Y includes a photosensitive drum 91, a charging roller 88, a developer 92, and a cleaner 95. The photosensitive drum 91 is an image carrier configured by applying an organic photoconductive layer to the outer circumference of an aluminum cylinder, and is rotationally driven by a motor (not shown). The charging roller 88 charges the surface of the photosensitive drum 91 to a uniform potential. An electrostatic latent image is formed when the exposure device 93 irradiates the surface of the photosensitive drum 91 with laser light or LED light via a mirror 94. The developer 92 uses toner to develop the electrostatic latent image and forms a toner image.

An intermediate transfer belt 40 is an intermediate transfer member stretched on a tension roller 41, a driving roller 42, and an inner roller 43, and is rotated in the direction of the arrow T by the driving roller 42. Primary transfer rollers 45Y, 45M, 45C, and 45Bk are provided on the inner circumferential surface side of the intermediate transfer belt 40. The primary transfer rollers 45Y, 45M, 45C, and 45Bk transfer toner images formed on the photosensitive drums 91 of the process cartridges 99Y, 99M, 99C, and 99Bk onto the intermediate transfer belt 40. When the intermediate transfer belt 40 rotates, the toner image is transported to a secondary transfer nip T2.

The secondary transfer nip T2 is constituted by the inner roller 43, the intermediate transfer belt 40, and an outer roller 44. The secondary transfer nip T2 transfers the toner image from the intermediate transfer belt 40 to the sheet S supplied from the registration unit 30. At this time, a transfer voltage for facilitating the transfer of the toner image is applied to the outer roller 44. A belt cleaner 46 cleans and collects residual toner remaining on the intermediate transfer belt 40.

Guides 35, 45 and a transport belt 51 transport the sheet S onto which the toner image has been transferred to the fixer 52. A fixing roller pair 54 of the fixer 52 fixes the toner image onto the sheet S by applying heat and pressure to the toner image and the sheet S. The fixer 52 is a heater that heat the toner image to fix the toner image on the sheet S.

A transport unit 60 transports the sheet S, onto a first surface of which the toner image has been fixed, to the decurler 110, or transports the sheet S to the transport unit 80. The transport unit 80 is used in double-sided printing. The transport unit 80 transfers the sheet S passed from the transport unit 60 to a transport unit 70. At this time, the transport direction of the sheet S is reversed. The transport unit 70 again passes the sheet S to the registration unit 30. A merging part 21 is a position where a transport path P2 of the transport unit 70 merges with a transport path P1 toward the secondary transfer nip T2 from the feed units 10a and 10b. The registration unit 30 transports the sheet S to the secondary transfer nip T2. The secondary transfer nip T2 transfers a toner image onto a second surface of the sheet S. The fixer 52 fixes the toner image onto the second surface of the sheet S. The transport unit 60 transports the sheet S to the decurler 110.

The decurler 110 includes two sets of correction rollers 111 and 114 that correct curls in the sheet S. The sheet S, which has passed through the decurler 110, is transported to an accessory 120.

The accessory 120 is a sheet processing device that executes post-processing (e.g., punching, stapling, and alignment) on the sheets S. Transport roller pairs 121 and 122 transport the sheet S and discharge the sheet S to a discharge tray 130.

Configuration and Operation of Decurler

Figure 2A:
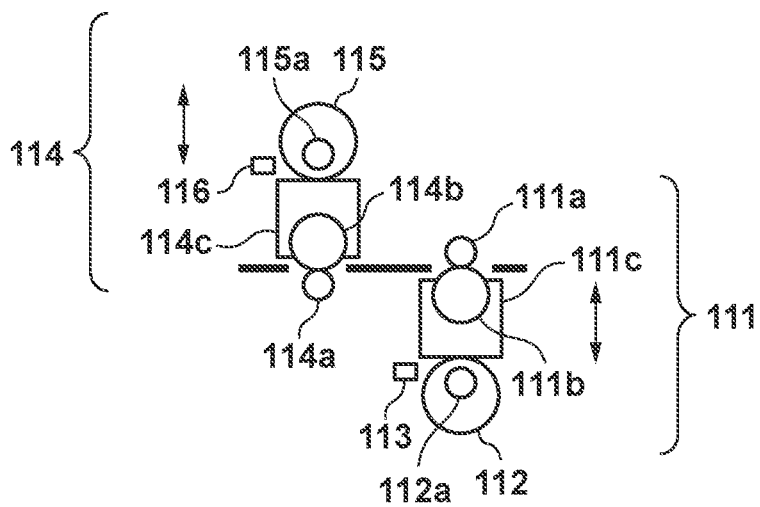
FIGS. 2A to 2C are diagrams illustrating a decurler.
Figure 2B:
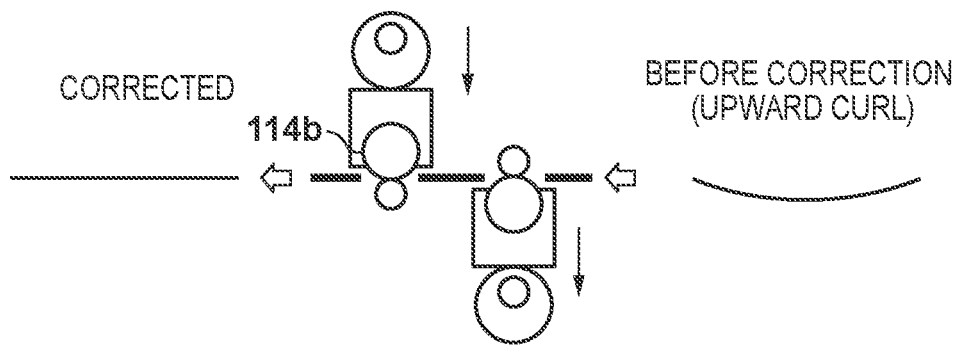
Figure 2C:
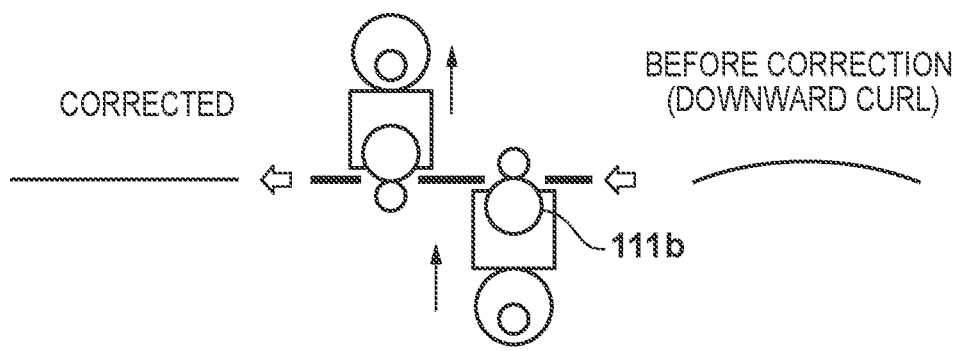

FIGS. 2A to 2C illustrate the configuration of the decurler 110. The sheet S, which has passed through the fixer 52 in the image forming apparatus 1, is transported to the decurler 110. The decurler 110 corrects (straightens) curling in the sheet S and discharges the sheet S. The correction rollers 111 and 114 are driven by a drive source such as a motor, and move up or down. Here, "up" and "down" are directions orthogonal to the transport direction of the sheet S.

Each of the correction rollers 111 and 114 has a first rotating body (metal rollers 111a and 114a) and a second rotating body (sponge rollers 111b and 114b). The metal rollers 111a and 114a are examples of inelastic rollers. The sponge rollers 111b and 114b are examples of elastic rollers. The sponge rollers 111b and 114b are supported by housings 111c and 114c, respectively. The housings 111c and 114c function as support members that support the sponge rollers 111b and 114b.

Cams 112 and 115 are movement mechanisms that move the sponge rollers 111b and 114b. The cams 112 and 115 rotate about the eccentric shafts 112a and 115a, respectively. An HP (home position) sensor 113 that detects one revolution of the cam 112 is provided in the vicinity of the cam 112. As the cam 112 makes one revolution, the cam surface of the cam 112 returns to the home position. Likewise, an HP sensor 116 that detects one revolution of the cam 115 is provided in the vicinity of the cam 115. As the cam 115 makes one revolution, the cam surface of the cam 115 returns to the home position.

The correction rollers 111 and 114 operate according to the same operating principles. Accordingly, the correction roller 111 will be described hereinafter as a representative example. The housing 111c of the sponge roller 111b is in contact with the cam 112. As the cam 112 rotates about the eccentric shaft 112a, the housing 111c moves in the direction indicated by the arrow in the drawing. In other words, when the cam surface of the cam 112 presses the housing 111c, the sponge roller 111b is pressed against the metal roller 111a. A nip pressure acting between the sponge roller 111b and the metal roller 111a changes as a result. This nip pressure is correlated with the pressure amount.

FIG. 2A illustrates a state in which the nip pressure between the sponge roller 111b and the metal roller 111a is minimum (phase=0 degrees) during one rotation of the cam 112. When the cam 112 rotates 180 degrees (phase=180 degrees), the housing 111c comes closest to the metal roller 111a. In other words, the nip pressure between the sponge roller 111b and the metal roller 111a is maximum. Furthermore, as the cam 112 continues to rotate, the housing 111c moves away from the metal roller 111a. When the rotation angle finally reaches 360 degrees (phase=0 degrees), the nip pressure is again minimum.

When the sponge rollers 111b and 114b move toward the metal rollers 111a and 114a, the sponge rollers 111b and 114b are compressed by the metal rollers 111a and 114a and change shape. Curls in the sheet S are corrected when the sheet S passes through a nip part between the metal roller 111a and the sponge roller 111b, or a nip part between the metal roller 114a and the sponge roller 114b.

"Upward curl" refers to a phenomenon in which the leading end and the following end of the sheet S in the transport direction of the sheet S rise in the vertical direction to above the center of the sheet S, as illustrated in FIG. 2B. "Downward curl" refers to a phenomenon in which the leading end and the following end of the sheet S in the transport direction of the sheet S drop in the vertical direction to below the center of the sheet S, as illustrated in FIG. 2C.

To correct upward curl, the nip pressure of the correction roller 114 is adjusted. Specifically, the sponge roller 114b moves downward in the vertical direction such that at least a part of the sponge roller 114b disposed above the metal roller 114a in the vertical direction is deformed by the metal roller 114a. Accordingly, when passing the correction roller 114, the sheet S is pressed against the metal roller 111a. The surface of the metal roller 111a protrudes in the direction opposite from the direction in which the center of the sheet S protrudes. This eliminates the curl in the sheet S.

To correct downward curl, the nip pressure of the correction roller 111 is adjusted. Specifically, the sponge roller 111b, which is disposed below the metal roller 111a in the vertical direction, moves upward in the vertical direction. This reduces the curl in the sheet S. In the example illustrated in FIG. 2C, the sponge roller 111b moves upward in the vertical direction, and moves until at least part of the sponge roller 111b is deformed by the metal roller 111a.

In the above-described example, the sponge roller 111b moves toward the metal roller 111a, but this is merely one example. The metal roller 111a may move toward the sponge roller 111b instead. In other words, at least a part of the sponge roller 111b can be deformed by the metal roller 111a as long as the distance between the sponge roller 111b and the metal roller 111a decreases. The sponge roller 111b and the metal roller 111a need not necessarily be disposed along the vertical direction. As long as the curl in the sheet S can be reduced, the sponge roller 111b and the metal roller 111a can be disposed along any direction.

In any case, the sponge roller 111b is disposed so as to make contact with one surface of the sheet S, and the metal roller 111a is disposed so as to contact the other surface of the sheet S. The metal roller 114a of the correction roller 114 is disposed so as to make contact with one surface of the sheet S, and the sponge roller 114b is disposed so as to make contact with the other surface of the sheet S.

Adjusting Curl Correction Performance

Curls arise when moisture within the sheet S evaporates. The amount of curl depends on the amount of moisture in the sheet S. Accordingly, to appropriately reduce curling, it is necessary to adjust the nip pressure of the correction roller 111 and the nip pressure of the correction roller 114 in accordance with the amount of moisture in the sheet S.

If heat is applied to the moisture contained in the sheet S in the fixer 52, when heat is applied to the first surface, more moisture is evaporated from the second surface than from the first surface. In other words, the expansion/contraction rate of the first surface and the expansion/contraction rate of the second surface of the sheet S are asymmetric, which produces a curl. The greater the amount of moisture in the sheet S is before passing through the fixer 52, the greater the amount of moisture is that will evaporate from the sheet S as a result of the heating by the fixer 52. This increases the expansion and contraction of the sheet S. In this manner, the amount of curl changes depending on the amount of moisture contained in the sheet S. For example, the amount of moisture contained in the sheet S may change after a user or maintenance worker has optimally set a curl correction force (adjustment value) of the decurler 110. In this case, it is necessary to update the adjustment value again.

There are also cases where a printing process carries over to the next day. The temperature and humidity on the previous day may not match the temperature and humidity on the current day. In other words, the amount of moisture contained in the sheet S changes.

The amount of moisture in the sheet S may change even if the temperature/humidity environment does not change. For example, when a single pack is constituted by 500 sheets, the amount of moisture may differ between the first to tenth sheets S and the 250th sheet S, counting from the topmost sheet.

In this manner, the amount of moisture contained in the sheet S changes, and thus the curl correction amount (nip pressure) should be adjusted according to the amount of moisture contained in the sheet S. For example, the nip pressure of the decurler 110 may be adjusted according to the amount of moisture detected in real time by the moisture sensor 31. Doing so will accurately reduce the curl in the sheet S.

Setting of Moisture Sensor Position and Transfer Current

As illustrated in FIG. 1, the moisture sensor 31 is disposed between the merging part 21 and the secondary transfer nip T2 in the transport path of the sheet S. This makes it possible for the single moisture sensor 31 to detect the sheet S fed from the feed units 10a and 10b, the transport unit 70, and other feed units connected to a front stage of the image forming apparatus 1. The moisture sensor 31 is disposed before the secondary transfer nip T2 in the transport direction of the sheet S because a transfer current is adjusted in accordance with the amount of moisture contained in the sheet S. The resistance value of the sheet S changes depending on the amount of moisture contained in the sheet S. Accordingly, the transfer current flowing through the secondary transfer nip T2 is different even if the same transfer voltage is applied to the outer roller 44. In other words, the transfer rate will vary, and the density of the toner image will change. Accordingly, the value of the transfer current can be kept at a target value by feeding back the results of the detection by the moisture sensor 31 to the transfer voltage. Unevenness in the density of the image is therefore less likely to occur.

Additionally, if the amount of moisture can be accurately measured, the transfer current can also be accurately controlled, which makes the density of the image even less uneven. What is needed, therefore, is to improve the detection accuracy of the moisture sensor 31.

Solution

To improve the detection accuracy of the moisture sensor 31, a complex mechanism is required, which increases both the size and the cost of the moisture sensor 31. Accordingly, the present embodiment proposes a moisture sensor 31 that is superior to past sensors in terms of having a smaller size and lower costs. For example, a moisture sensor 31 is proposed in which light output from a light-emitting element is reflected multiple times at the surface of the sheet S, which serves as a measurement subject, and the light is then received by a light-receiving element. This makes it easier for the amount of light received by the light-receiving element (a received light amount) to change depending on the moisture. This in turn realizes a moisture sensor 31 that is superior to past sensors in terms of having a smaller size and lower costs.

Wavelength Used for Moisture Detection

Figure 3:
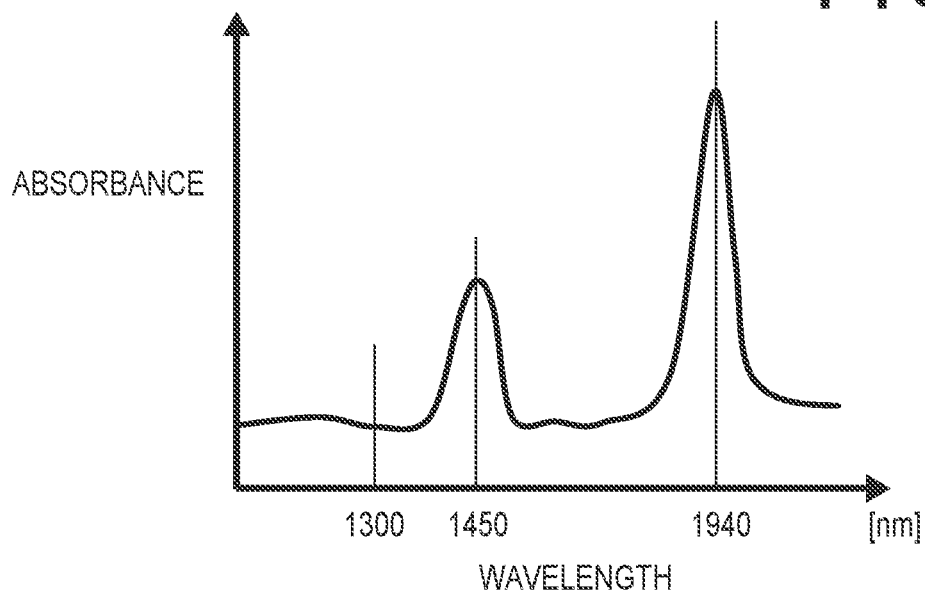
FIG. 3 is a diagram illustrating a relationship between a wavelength of light and a moisture absorption rate (absorbance).

FIG. 3 illustrates a relationship between a light emission wavelength and an absorbance rate due to moisture. A wavelength having a characteristics of being absorbed by moisture is used is measurements of the amount of moisture using near-infrared light. Wavelength bands greater than or equal to 1,000 nm have a characteristic in that light having a specific wavelength is absorbed by water. In other words, the more moisture is present, the more light is absorbed. When detecting moisture using the absorption characteristics of light, it is more advantageous to use light of a wavelength that is more easily absorbed by moisture. This is because the output changes more in response to changes in the amount of moisture in the measurement subject, which improves the detection accuracy of the moisture sensor 31. In the near-infrared wavelength band, 1,940 nm light is most easily absorbed by water, followed by 1,450 nm light.

As described above, a tungsten light source or a halogen light source increases the size of the moisture sensor 31. Accordingly, in the present embodiment, a semiconductor light-emitting element is used as the light source. Here, a light-emitting diode (LED), which is advantageous in terms of reducing the size of the moisture sensor 31, is used.

LEDs having a 1,940 nm light emission wavelength are not mass-produced, and are extremely difficult to obtain. Accordingly, an LED having a peak light emission wavelength of 1,450 nm is used in the present embodiment.

Figure 4:
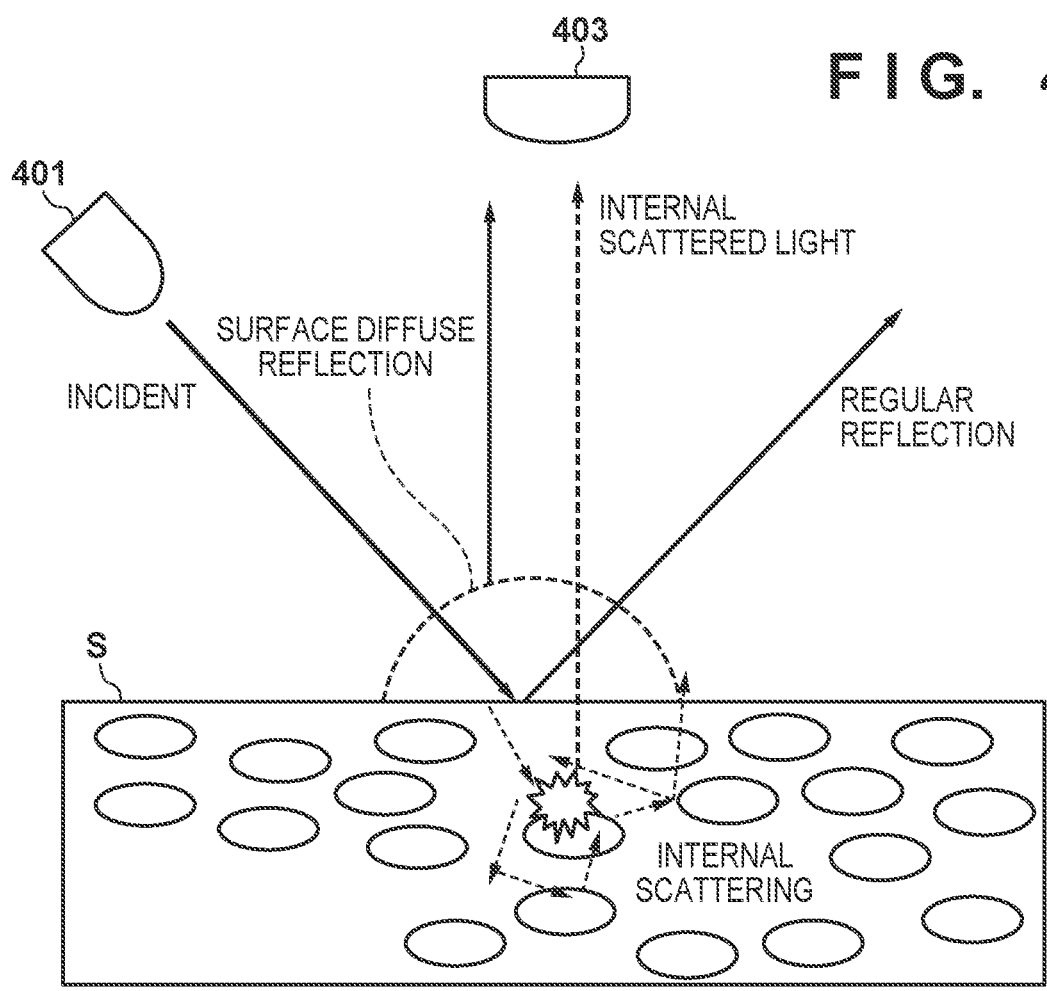
FIG. 4 is a diagram illustrating the behavior of light emitted onto a sheet.

As illustrated in FIG. 4, 1,450 nm light has a lower absorbance than 1,940 nm light. Accordingly, a 1,450 nm LED is disadvantageous in terms of detection accuracy, compared to a 1,940 nm LED. Multipath-reflected light is therefore used, as will be described below.

Operating Principles of Reflective Sensors

FIG. 4 illustrates a moisture sensor 31 that receives light reflected only once by the sheet S. The moisture sensor 31 includes an LED 401 and a PD 403. "PD" is an acronym for "photodiode". The light emitted from the LED 401 onto the sheet S is divided into a reflected light component reflected at the surface of the sheet S and a transmitted light component that enters into the sheet S. The transmitted light is irregularly reflected repeatedly by the inner fibers (cellulose) of the sheet S, and scatters internally. Then, some of the internal scattered light exits from the surface of the sheet S. The internal scattered light is attenuated by the moisture contained in the sheet S. In other words, the light affected by the moisture in the sheet S is the internal scattered light. Accordingly, of the light incident on the PD 403, only the internal scattered light changes according to the moisture in the sheet S.

On the other hand, the component of light reflected at the surface of the sheet S is not affected by the moisture contained in the sheet S. This light is therefore noise light. Furthermore, of the component of light reflected at the surface of the sheet S, regularly-reflected light has a high power. Accordingly, the PD 403 is disposed in a position where the regularly-reflected light component is not incident. In this example, the incident angle of the light from the LED 401 is 45 degrees, and thus the PD 403 is disposed so as to avoid positions where a reflection angle is 45 degrees. For example, the PD 403 is disposed such that the optical axis of the PD 403 is orthogonal to the surface of the sheet S.

Measurement Example

Figure 5:
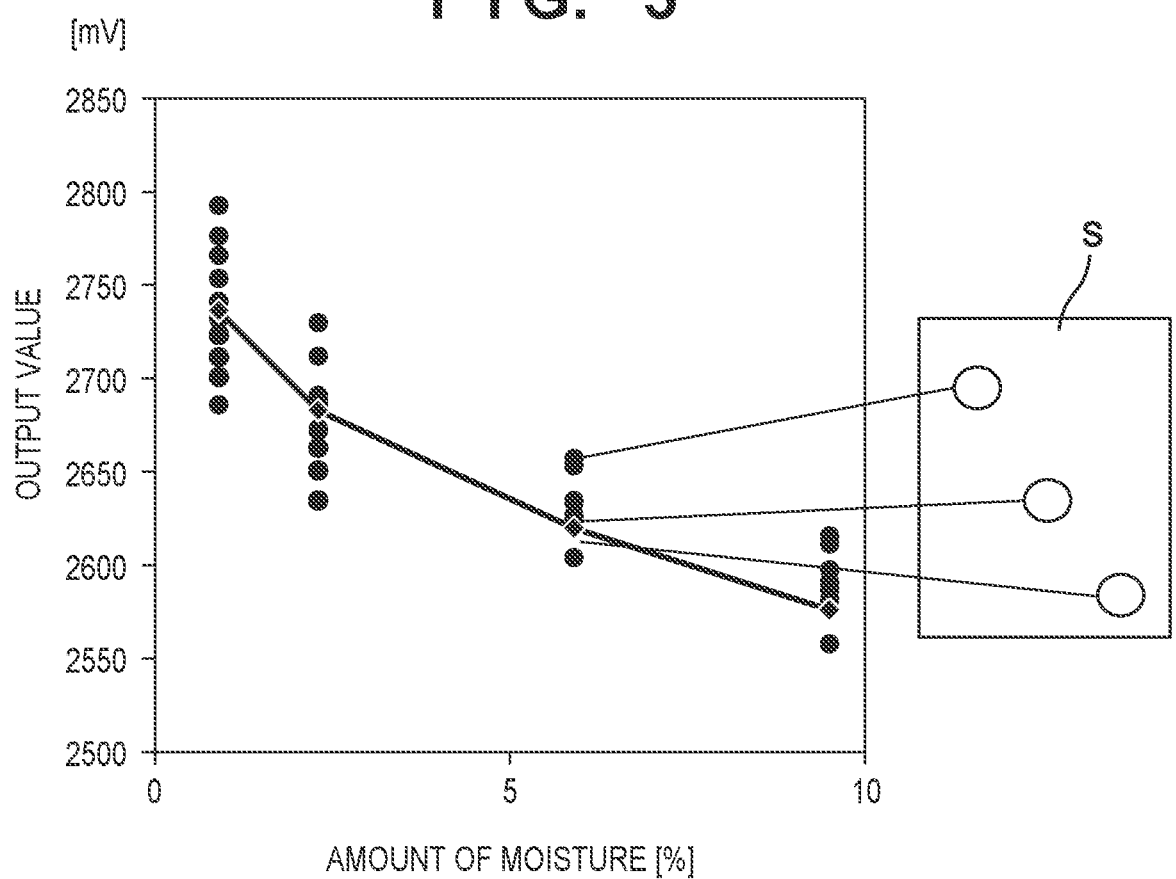
FIG. 5 is a diagram illustrating a relationship between an amount of moisture and an output value of a light-receiving element.

FIG. 5 illustrates an output voltage (output value) of the PD 403 for various moisture content percentages. The horizontal axis represents the moisture content percentage. The vertical axis represents the output value. Here, sheets S that were left for a sufficiently long time in four environments having different humidities were prepared. A sample (measurement) was taken at 12 different locations on the surface of each sheet S (the circular plots). The diamond plots indicate the averages of those 12 sample values. Focusing on the average values of the four sheets S, the output value decreases as the amount of moisture in the sheet S increases. In other words, the reflected light is dampened according to the amount of moisture in the sheet S.

Focusing on 2,700 mV, the amount of change in the output value dependent on the moisture is 200 mV. As a percentage, this change is 6%. On the other hand, 100 mV variations also occur in the output value according to differences in the measurement locations on the sheet S. In other words, half of the amount of change in the output value dependent on the moisture is noise. As such, the detection accuracy of the moisture sensor 31 that receives light reflected only once by the sheet S is low.

Figure 6:
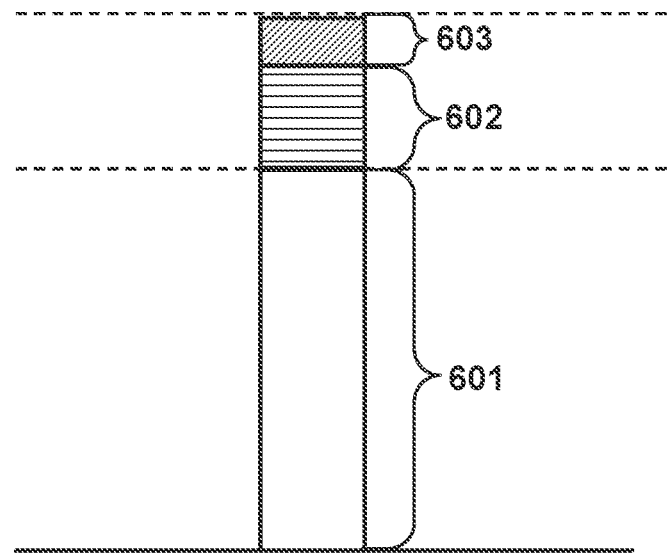
FIG. 6 is a diagram illustrating a breakdown of a received light amount.

FIG. 6 is a cumulative bar graph illustrating a breakdown of the light received by the PD 403. 601 indicates the amount of diffusely-reflected light from the surface of the sheet S. 602 and 603 indicate the amount of light, of the internal scattered light, which is emitted directly above the sheet S and received by the PD 403. In particular, 602 indicates light, of the internal scattered light, which is not absorbed by moisture. 603 indicates light, of the internal scattered light, which is absorbed by moisture and changes.

Most of the sheets S circulating in the market are white plain paper, which has a high surface reflectance. Accordingly, even if the PD 403 is disposed in a position where regularly-reflected light is not incident, diffusely-reflected light arising at the surface of the sheet S accounts for the majority of the light received by the PD 403. Furthermore, even if near-infrared light belonging to a wavelength band having a high absorbance is emitted onto the sheet S, not even half of that light will be absorbed. The percentage of light absorbed within a sheet S having a moisture content of 0% to 10% is only about that indicated by the hatched part 603. Therefore, about 200 mV (i.e., 6%) of the output value of 2,700 mV merely represents the amount of change due to moisture.

Use of Multipath-Reflected Light

First Example of Structure of Reflecting Member

Figure 7A:
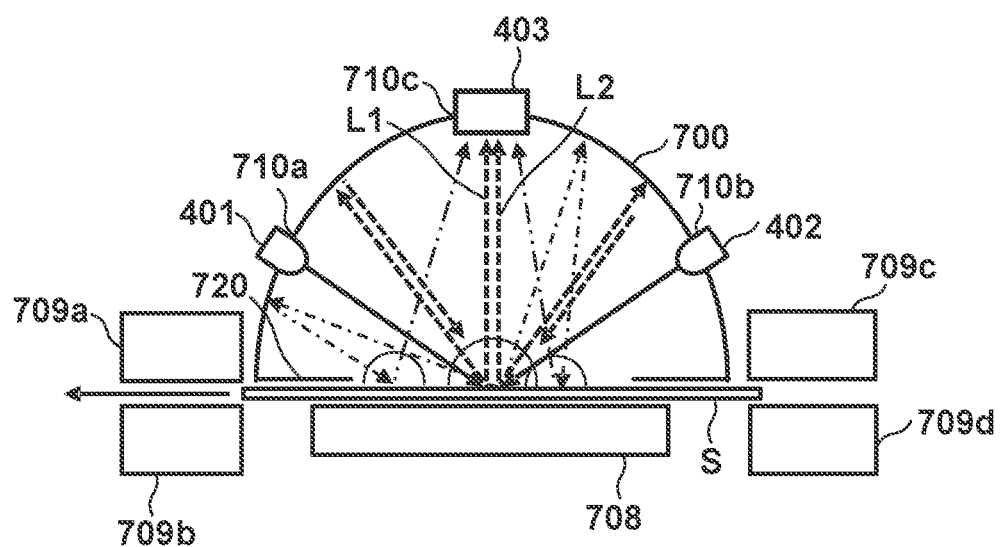
FIGS. 7A and 7B are diagrams illustrating the structure of a moisture sensor.
Figure 7B:
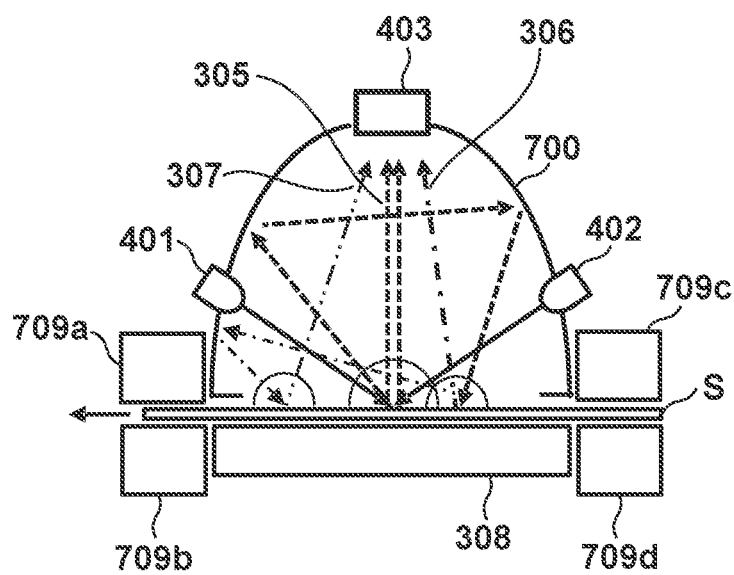

FIG. 7A and FIG. 7B illustrate a moisture sensor 31 capable of receiving multipath-reflected light. The sheet S is transported along sheet guides 709a to 709d. A reference plate 708 is a support plate for transporting the sheet S in a stable manner.

The light emission wavelength band of the LED 401 includes 1,450 nm, which is a wavelength at which light is absorbed by moisture. In other words, the peak light emission wavelength of the LED 401 is 1,450 nm. The light emission wavelength band of an LED 402 includes 1,300 nm, which is a wavelength at which light is not easily absorbed by moisture. The peak light emission wavelength of the LED 402 is 1,300 nm. The PD 403 is disposed in a position where regularly-reflected light from the sheet S is not directly received.

A reflecting member 700 is a mirror having a shape that covers the LEDs 401 and 402 and the PD 403 (a dome shape). In the present embodiment, "dome shape" includes hemispheres, hollow semi-ellipsoid shapes, saucer shapes, pot-like shapes, bowl-like shapes, and shell-like shapes. The reflecting member 700 may have, for example, three openings 710a, 710b, and 710c. The LED 401 is attached to the opening 710a, or the opening 710a is provided such that light from the LED 401 passes therethrough. The LED 402 is attached to the opening 710b, or the opening 710b is provided such that light from the LED 402 passes therethrough. The PD 403 is attached to the opening 710c, or the opening 710c is provided such that light traveling toward the PD 403 passes therethrough.

Furthermore, the reflecting member 700 is provided in order to cause the light output from the LED 401 to be reflected multiple times at the surface of the sheet S. In other words, the light output from the LED 401 is reflected at least once by the reflecting member 700, and is reflected at least twice by the surface of the sheet S.

FIG. 7A illustrates a hemispheric reflecting member 700. Because the inner surface of the hemispheric reflecting member 700 is a mirror surface, the diffusely-reflected light produced at a position where the sheet S is located returns to that position, and enters into the sheet S more easily from that position. As a result, the PD 403 can capture light reflected by the sheet S multiple times.

For example, in FIG. 7A, L1 represents light reflected only once at the surface of the sheet S (primary reflected light). L2 represents light reflected twice at the surface of the sheet S (secondary reflected light). L3 represents light reflected three times at the surface of the sheet S (tertiary reflected light). Providing the reflecting member 700 in this manner makes it possible for the PD 403 to efficiently collect the internal scattered light from the sheet S. Meanwhile, the PD 403 can receive light incident multiple times on the sheet S.

By providing the hemispherical reflecting member 700 in this manner, internal scattered light that is susceptible to the effects of moisture is emitted from inside the sheet S toward the hemispherical reflecting member 700. This makes it possible to efficiently collect the internal scattered light and for that light to be captured by the PD 403. As a result, components affected by moisture can be increased in the output value from the moisture sensor 31.

As illustrated in FIG. 7B, the shape of the reflecting member 700 need not be a hemisphere. In other words, the curvature factor of the reflecting member 700 may be any curvature factor that makes it possible to improve the accuracy of moisture detection. If the shape of the reflecting member 700 is not hemispherical, the diffusely-reflected light produced at a given position of the sheet S is reflected by the reflecting member 700, and proceeds to another position on the surface of the sheet S, or to another reflective position on the reflecting member 700. As a result, light reflected multiple times by the sheet S is incident on the PD 403.

Compared to the reflecting member 700 in FIG. 7A, the reflecting member 700 in FIG. 7B can reflect light over a broader area on the surface of the sheet S. In other words, although the reflecting member 700 in FIG. 7A makes it easier to increase the number of reciprocal reflections between the sheet S and the reflecting member 700, the reflecting member 700 in FIG. 7B makes it easier to reflect light at various surfaces of the sheet S.

Incidentally, when paper debris or the like adheres to the LEDs 401 and 402 and the PD 403, the accuracy of moisture detection drops. As illustrated in FIGS. 7A and 7B, the moisture sensor 31 can detect the amount of moisture in the sheet S without contacting the sheet S. In other words, the moisture sensor 31 is less susceptible to the effects of paper debris.

Furthermore, a light-transmissive protective member 720 may be provided at the bottom of the dome that constitutes the reflecting member 700. The protective member 720 is a glass plate, for example. This further reduces the effects of paper debris. In FIG. 7A, the protective member 720 has a donut shape, but may have a circular shape that completely covers the bottom surface of the dome.

The protective member 720 may also be capable of suppressing vibrations in the transported sheet S. The reference plate 708 and the sheet guides 709a to 709d similarly suppress vibrations in the transported sheet S. Note that the reference plate 708 may function as a diffuser plate that diffuses light from the LEDs 401 and 402 when no sheet S is present.

Effects of Multipath-Reflected Light

The light reflected by the surface of the sheet S multiple times is repeatedly absorbed by the moisture contained in the sheet S. Accordingly, the amount of light attenuation increases with respect to the amount of moisture contained in the sheet.

Figure 8A:
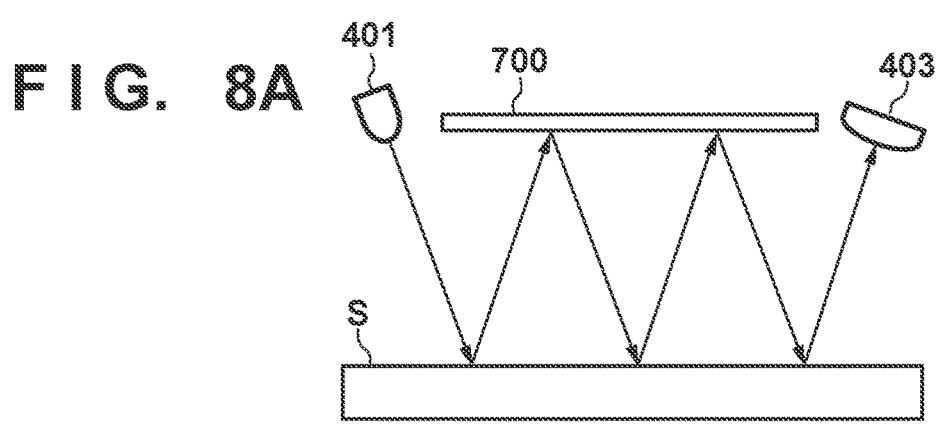
FIGS. 8A to 8C are diagrams illustrating advantages provided by multipath-reflected light.

FIG. 8A illustrates the arrangement of the LED 401, the reflecting member 700, and the PD 403. The light output from the LED 401 is received by the PD 403 while being repeatedly reflected between the reflecting member 700 and the surface of the sheet S. Each time the light is reflected by the surface of the sheet S, the light is absorbed by the moisture. Accordingly, the light reflected by the surface of the sheet S multiple times is attenuated more. In other words, as the number of reflections increases, so too does the amount of light attenuation.

Figure 8B:
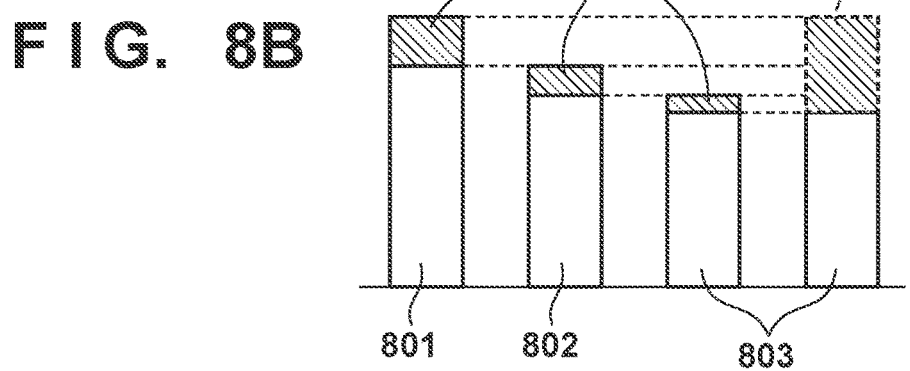

FIG. 8B is a cumulative graph illustrating components of light that depend on differences in the number of reflections by the surface of the sheet S. 801 represents the amount of light reflected only once by the surface of the sheet S. 802 represents the amount of light reflected twice by the surface of the sheet S. 803 represents the amount of light reflected three times by the surface of the sheet S. 804 represents the amount of light reflected four times by the surface of the sheet S. 800 represents the amount of light attenuated due to moisture in each instance of reflection. 805 represents the sum of the attenuation amounts produced by three instances of reflection.

In this manner, the amount of light reflected by the surface of the sheet S multiple times increases the amount of attenuation of the light with respect to the amount of moisture in the sheet S. The structure of the reflecting member 700 illustrated in FIGS. 7A and 7B can increase the effect of moisture absorption by causing light to be incident on the sheet S multiple times, and furthermore, and the PD 403 can collect the light even more efficiently. Compared to the moisture sensor 31 illustrated in FIG. 4, which does not have the reflecting member 700, the moisture sensor 31 illustrated in FIGS. 7A and 7B can approximately triple the amount of change in the output value due to moisture.

Figure 8C:
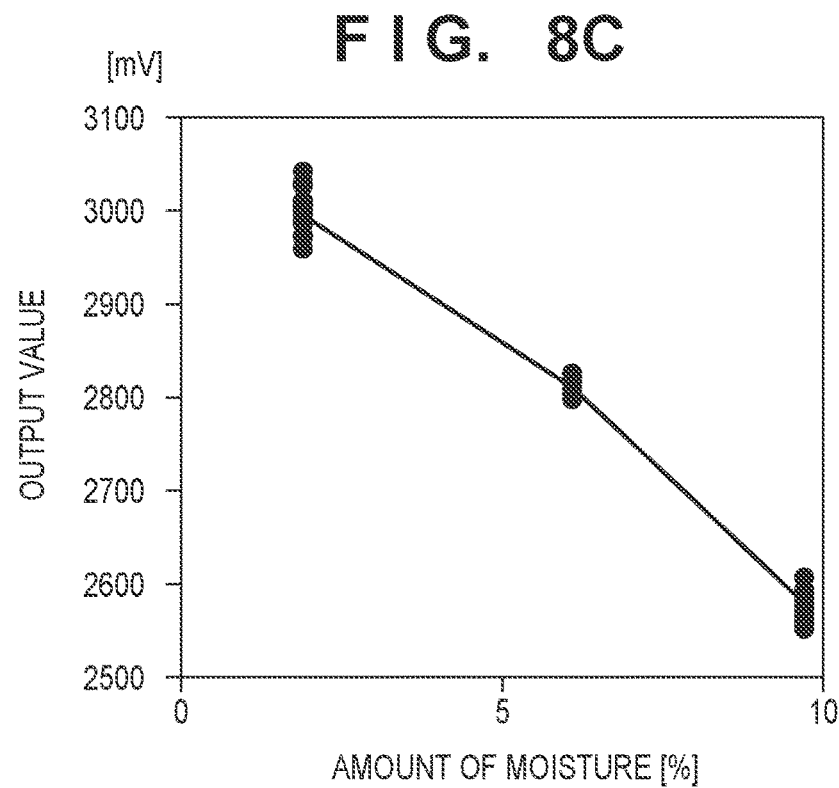

FIG. 8C illustrates results of measurements by the moisture sensor 31 illustrated in FIGS. 7A and 7B. The measurement conditions (number of samples and statistical method) are basically the same as in the case illustrated in FIG. 5. Here, sheets S that were left for a sufficiently long time in three environments having different humidities were used as measurement subjects. Compared to FIG. 5, in FIG. 8C, the amount of change in the output value due to a change in the amount of moisture has increased from 150 mV to 450 mV. In addition, the variation in the output value relative to identical amounts of moisture is has decreased.

Reason for Providing LED 402 Having Peak Light Emission Wavelength of 1,300 nm

The LED 402 is used to improve the accuracy of detecting moisture in the sheet S. Specifically, by dividing a detection result for light in a wavelength band having a low absorbance by a detection result for light in a wavelength band having a high absorbance, the effect of uneven reflection and uneven fiber density at the surface of the sheet S is reduced.

The LED 401 and the LED 402 are lighted selectively. The output value of the PD 403 when the LED 401 emits light is divided by the output value of the PD 403 when the LED 402 emits light. A corrected output value Vr is obtained from the following formula.

$$Vr = V1 \div V2 \qquad (1)$$

Here, V1 is the output value of the PD 403 when only the LED 401 having a peak light emission wavelength of 1,450 nm emits light. V2 is the output value of the PD 403 when only the LED 402 having a peak light emission wavelength of 1,300 nm emits light.

Correcting the output value using Formula (1) reduces variation among output values for the same amount of moisture. In other words, noise is reduced, which improves the detection accuracy of the moisture sensor 31.

Second Example of Structure of Reflecting Member

Figure 9:
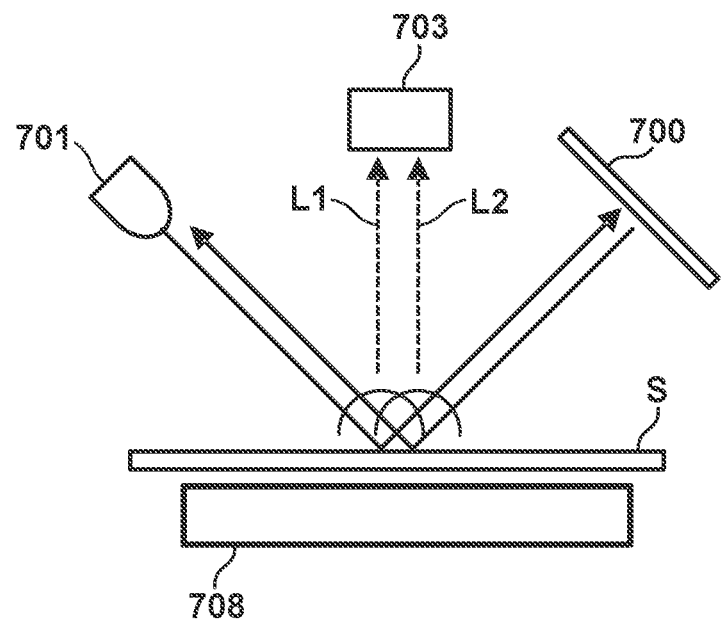
FIG. 9 is a diagram illustrating the structure of a moisture sensor.

FIG. 9 illustrates the moisture sensor 31 according to a second embodiment. The moisture sensor 31 includes the LED 401, the reflecting member 700, the reference plate 708, and the PD 403. The PD 403 is disposed in a position where a regular reflection component from the sheet S is not directly received. For example, the PD 403 is disposed directly above the position of the sheet S which is irradiated with light from the LED 401.

Of the light emitted from the LED 401 onto the sheet S, the primary reflected light L1, which has been diffusedly reflected in the direction of the PD 403, is received by the PD 403. The light emitted onto the sheet S and then reflected in the direction of the reflecting member 700 is re-emitted onto the sheet S by the reflecting member 700. Furthermore, the light is diffusedly reflected in the direction of the PD 403, and is then received by the PD 403 as the secondary reflected light L2.

As described in the first embodiment, the light reflected multiple times by the sheet S is absorbed multiple times by the moisture contained in the sheet S. Accordingly, the accuracy with which the moisture sensor 31 according to the second embodiment detects moisture is higher than in the comparative example in which only the primary reflected light L1 is received.

Third Example of Structure of Reflecting Member

Figure 10:
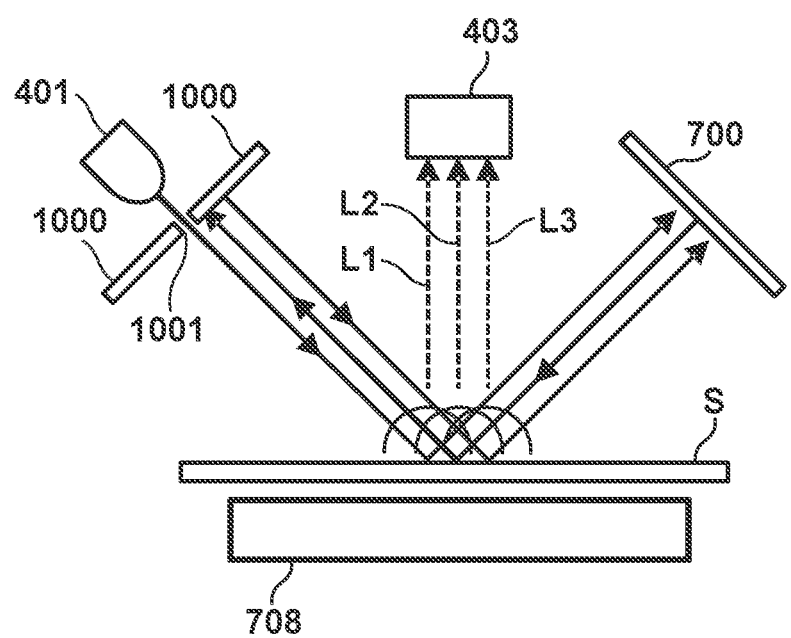
FIG. 10 is a diagram illustrating the structure of a moisture sensor.

FIG. 10 illustrates the moisture sensor 31 according to a third embodiment. In the third embodiment, a second reflecting member 1000 is added to the second embodiment. The reflecting member 1000 is installed on the front surface of the LED 401. The reflecting member 1000 includes an opening 1001, and the sheet S is irradiated with light irradiated from the LED 401 through the opening 1001.

As in the second embodiment, the sheet S is irradiated with light a second time by the reflecting member 700. In the third embodiment, the light reflected from the sheet S toward the reflecting member 1000 is reflected by the reflecting member 1000, and the sheet S is irradiated with that light again. Furthermore, the light is reflected by the sheet S and is received by the PD 403 as tertiary reflected light L3.

Similarly, the light is repeatedly reflected by the reflecting member 700, the sheet S, and the reflecting member 1000, and is then received by the PD 403 as nth-order reflected light Ln. By installing a plurality of reflecting members 700 and 1000 in this manner, the PD 403 can receive light repeatedly reflected by the sheet S.

Although the reflecting members 700 and 1000 are illustrated as planar mirrors, it should be noted that this is only one example. The reflecting members 700 and 1000 may be curved.

Controller

Figure 11:
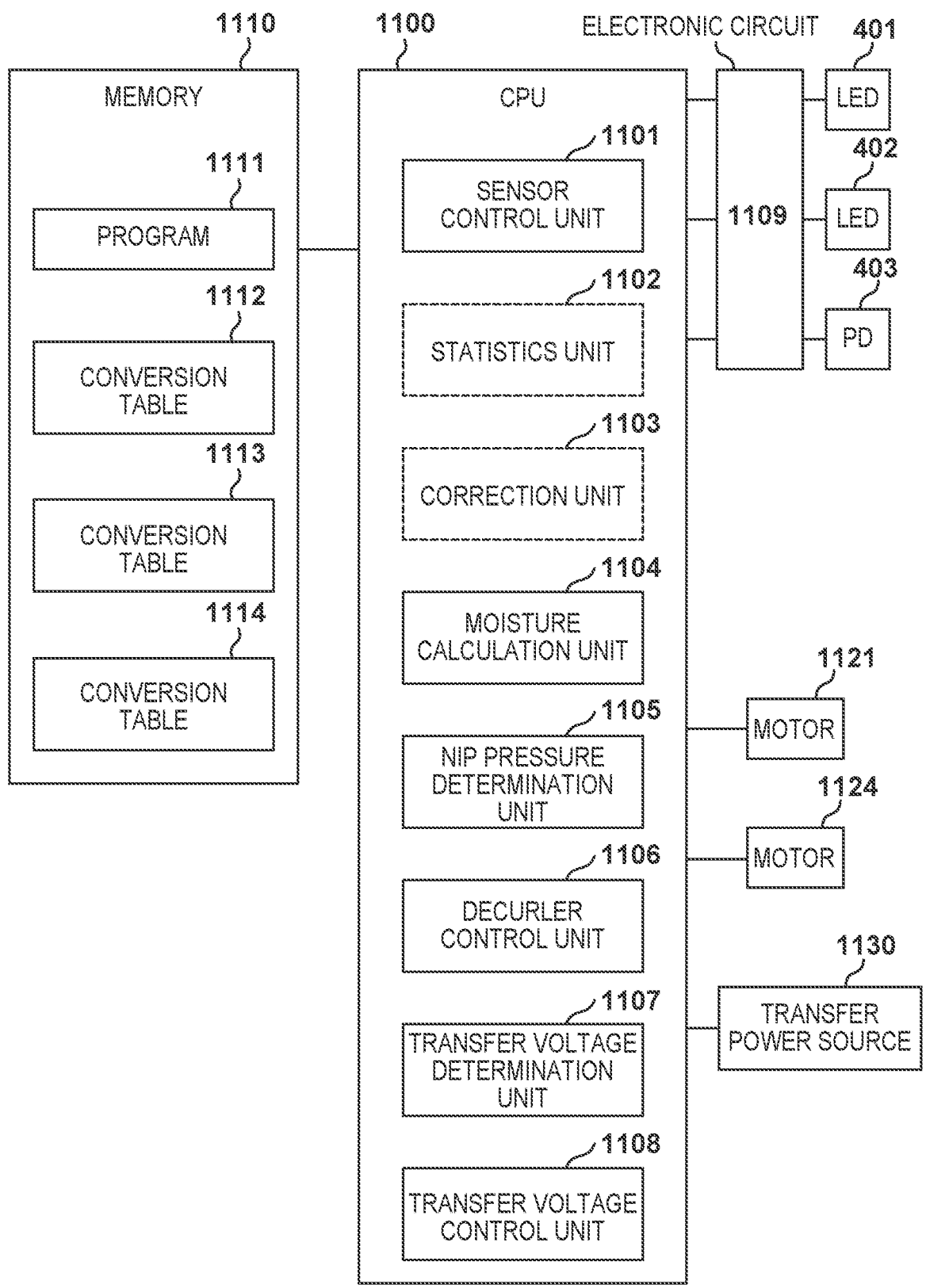
FIG. 11 is a diagram illustrating a controller.

FIG. 11 illustrates a controller of the image forming apparatus 1 and the moisture sensor 31. A CPU 1100 controls the image forming apparatus 1 and the moisture sensor 31 according to a program 1111 stored in a ROM (read-only memory) area of a memory 1110. The memory 1110 may include a Random Access Memory (RAM), a Hard Disk Drive (HDD), a Solid-State Drive (SSD), or the like.

An electronic circuit 1109 includes a constant current circuit that drives the LEDs 401 and 402, an amplification circuit that amplifies an output signal output from the PD 403, and an A/D conversion circuit that converts the amplified output signal into a digital value.

A sensor control unit 1101 causes the LEDs 401 and 402 to light, supplies power to the PD 403, and so on through the electronic circuit 1109. A statistics unit 1102 performs statistical processing (averaging and the like) on detection results of the PD 403 output from the electronic circuit 1109. Noise included in the output value is reduced as a result. A correction unit 1103 corrects the output value based on the aforementioned Formula (1).

A moisture calculation unit 1104 calculates an amount of moisture based on the corrected output value. The moisture calculation unit 1104 may convert the output value to an amount of moisture using a conversion table 1112. The conversion table 1112 holds relationships between output values and amounts of moisture in advance. Note that the conversion table 1112 may be stored in the memory 1110 for each type (e.g., basis weight) of sheet S.

A nip pressure determination unit 1105 determines the nip pressure of the correction rollers 111 and 114 of the decurler 110 in accordance with the amount of moisture. The nip pressure determination unit 1105 may determine the nip pressure corresponding to the amount of moisture by referring to a conversion table 1113. The conversion table 1113 may be stored in the memory 1110 for each type (e.g., basis weight) of sheet S. A decurler control unit 1106 controls motors 1121 and 1124 such that the determined nip pressure is applied. The motor 1121 is a motor that rotates the cam 112 of the correction roller 111. The motor 1124 is a motor that rotates the cam 115 of the correction roller 114.

A transfer voltage determination unit 1107 determines the secondary transfer voltage based on the amount of moisture. The transfer voltage determination unit 1107 may determine the secondary transfer voltage corresponding to the amount of moisture by referring to a conversion table 1114. The conversion table 1114 may be stored in the memory 1110 for each type (e.g., basis weight) of sheet S. A transfer voltage control unit 1108 sets the secondary transfer voltage corresponding to the amount of moisture in a transfer power source 1130. As a result, the transfer power source 1130 generates a secondary transfer voltage, which is applied to the outer roller 44.

Flowchart

Figure 12:
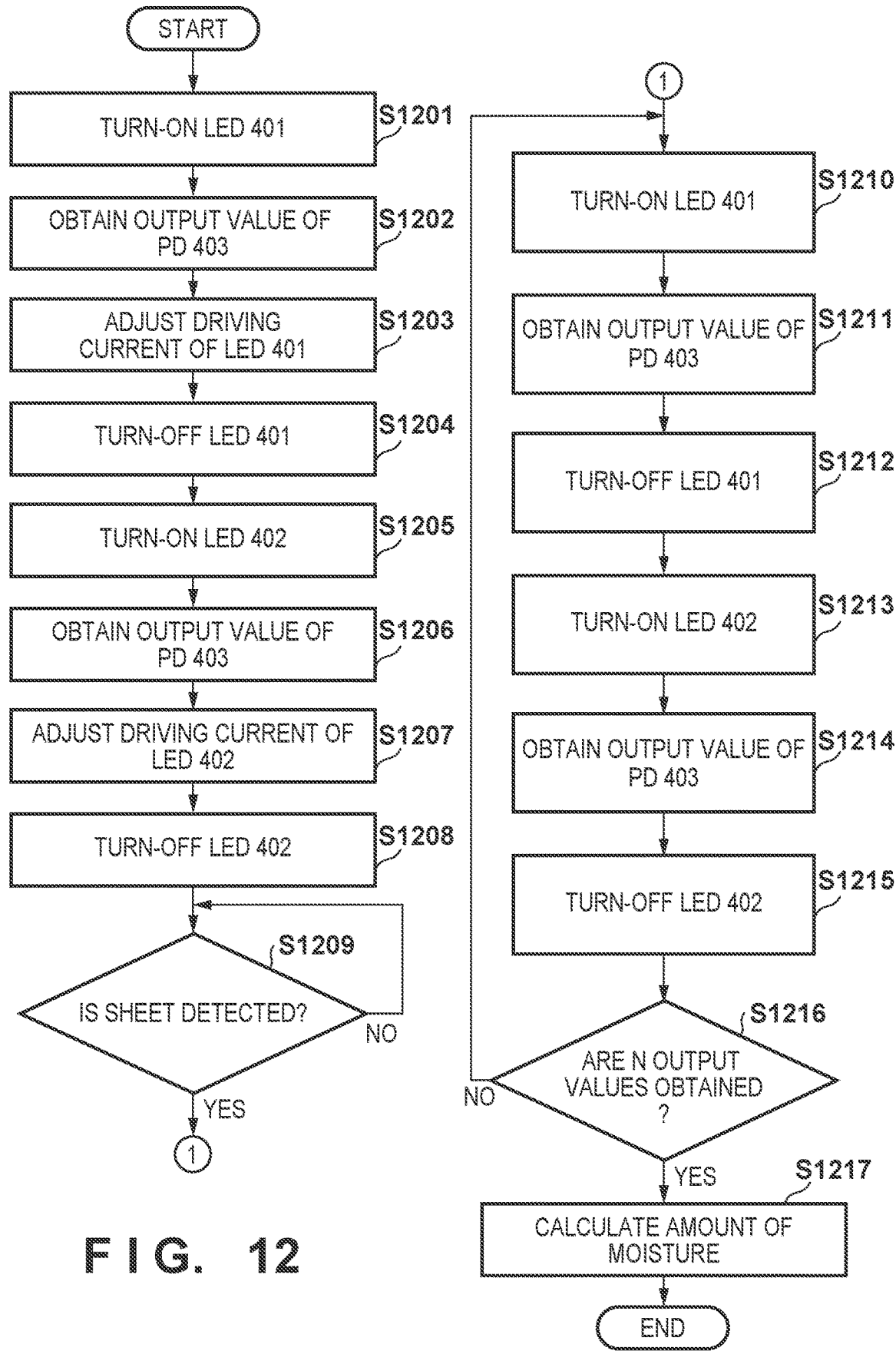
FIG. 12 is a flowchart illustrating a method for detecting an amount of moisture.

FIG. 12 is a flowchart illustrating a method for calculating the amount of moisture. The CPU 1100 executes the following processing by executing the program 1111.

In step S1201, the CPU 1100 (the sensor control unit 1101) lights (turns on) the LED 401. At this time, the value of driving current flowing through the LED 401 is a default value stored in the memory 1110 in advance.

In step S1202, the CPU 1100 (the sensor control unit 1101) obtains the output value of the PD 403. At this time, there is no sheet S at a detection position of the moisture sensor 31. As such, the moisture sensor 31 detects the reference plate 708.

In step S1203, the CPU 1100 (the sensor control unit 1101) adjusts the driving current of the LED 401 based on the output value of the PD 403. For example, the sensor control unit 1101 adjusts the driving current such that the output value of the PD 403 matches a predetermined target value. The sensor control unit 1101 stores the driving current from when the output value matches the predetermined target value in the memory 1110. This driving current is used when detecting the amount of moisture in the sheet S.

In step S1204, the CPU 1100 (the sensor control unit 1101) extinguishes (turns off) the LED 401.

In step S1205, the CPU 1100 (the sensor control unit 1101) lights the LED 402. At this time, the value of driving current flowing through the LED 402 is a default value stored in the memory 1110 in advance.

In step S1206, the CPU 1100 (the sensor control unit 1101) obtains the output value of the PD 403. At this time, there is no sheet S at the detection position of the moisture sensor 31. As such, the moisture sensor 31 detects the reference plate 708.

In step S1207, the CPU 1100 (the sensor control unit 1101) adjusts the driving current of the LED 402 based on the output value of the PD 403. For example, the sensor control unit 1101 adjusts the driving current such that the output value of the PD 403 matches a predetermined target value. The sensor control unit 1101 stores the driving current from when the output value matches the predetermined target value in the memory 1110. This driving current is used when detecting the amount of moisture in the sheet S.

In step S1208, the CPU 1100 (the sensor control unit 1101) extinguishes the LED 402.

In step S1209, the CPU 1100 supplies a sheet S from the feed unit 10a, and determines whether the sheet S is detected by the sheet sensor 22. If the sheet S is detected, the CPU 1100 moves the sequence to step S1210.

In step S1210, the CPU 1100 (the sensor control unit 1101) lights the LED 401. At this time, the value of driving current flowing through the LED 401 is the value adjusted in step S1203 and stored in the memory 1110.

In step S1211, the CPU 1100 (the sensor control unit 1101) obtains the output value of the PD 403. At this time, there is a sheet S at the detection position of the moisture sensor 31. Additionally, at this time, the sheet S continues to move without stopping.

In step S1212, the CPU 1100 (the sensor control unit 1101) extinguishes the LED 401.

In step S1213, the CPU 1100 (the sensor control unit 1101) lights the LED 402. At this time, the value of driving current flowing through the LED 402 is the value adjusted in step S1207 and stored in the memory 1110.

In step S1214, the CPU 1100 (the sensor control unit 1101) obtains the output value of the PD 403. At this time, there is a sheet S at the detection position of the moisture sensor 31. Additionally, at this time, the sheet S continues to move without stopping.

In step S1215, the CPU 1100 (the sensor control unit 1101) extinguishes the LED 401.

In step S1216, the CPU 1100 determines whether N output values have been obtained for each of the LED 401 and the LED 402. If N output values for each of the LED 401 and the LED 402 have been obtained and stored in the memory 1110, the CPU 1100 moves the sequence to step S1217. On the other hand, if N output values have not been obtained, the CPU 1100 moves the sequence to step S1210 and repeats steps S1210 to S1216.

In step S1217, the CPU 1100 calculates the amount of moisture based on the output value. For example, the statistics unit 1102 reads out the N output values obtained for the LED 401 from the memory 1110, performs statistical processing, and obtains the average value V1. The statistics unit 1102 also reads out the N output values obtained for the LED 402 from the memory 1110, performs statistical processing, and obtains the average value V2. The correction unit 1103 obtains the corrected output value Vr based on Formula (1). Furthermore, the moisture calculation unit 1104 calculates the amount of moisture based on the output value Vr and the conversion table 1112. Note that the order of the statistical processing and the correction processing is merely one example. The statistical processing may be executed for the correction value after first executing the correction processing.

In this manner, the output value for reflected light at 1,450 nm and the output value for reflected light at 1,300 nm are detected while transporting the sheet S, and are stored in the memory 1110. Although the sheet S is constantly moving, the reflective positions of the reflected light based on the respective output values are close.

Figures 13, 14:
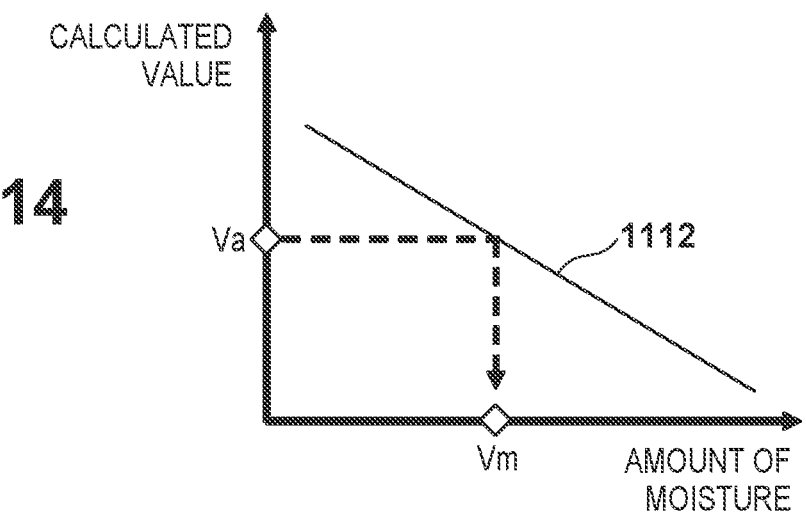
FIG. 13 is a diagram illustrating a relationship between an address and data in a memory.
FIG. 14 is a diagram illustrating a method for converting a calculated value into an amount of moisture.

FIG. 13 illustrates a data region of the memory 1110. Here, it is assumed that N=500. The output values for reflected light at 1,450 nm is stored at addresses 001 to 500. The output values for reflected light at 1,300 nm is stored at addresses 1001 to 1500. For the data at 001, the correction unit 1103 finds the correction value using the data at the address 1001. For the data at the address 002, the correction unit 1103 finds the correction value using the data at 1002. Formula (2) is a generalization of this.

$$Vr[i] = V1[i] + V2[n+1000] \qquad (2)$$

Here, i represents an index indicating an address, and is an integer from 1 to 500. The statistics unit 1102 finds an average value Va.

$$Va = \Sigma(Vr[i]) \div N \qquad (3)$$

FIG. 14 illustrates a method for conversion from the conversion table 1112 (a calibration curve) and the calculated value Va to an amount of moisture Vm in the sheet S.

The moisture calculation unit 1104 can obtain the amount of moisture Vm corresponding to the calculated value Va from the calibration curve (a characteristic formula) corresponding to the conversion table 1112.

According to the present embodiment, the light amount is adjusted using the reference plate 708. This reduces the effects of the environment in which the moisture sensor 31 is installed and the effects of individual differences between moisture sensors 31. Meanwhile, the conversion table 1112 (the calibration curve) is obtained in advance when the moisture sensor 31 is shipped from the factory, and is saved in the ROM region of the memory 1110. By reducing the effects of the environment in which the moisture sensor 31 is installed and the effects of individual differences between moisture sensors 31, the moisture sensor 31 comes closer to the state assumed at the time of design, which improves the accuracy when determining the amount of moisture using the conversion table 1112.

Decurler Nip Pressure Adjustment

FIG. 15 illustrates a method for adjusting the nip pressure (pressure amount) of the decurler 110 based on the amount of moisture. The CPU 1100 executes the following processing when a user instructs printing to be performed.

In step S1501, the CPU 1100 controls the feed unit 10*a* to start feeding the sheet S. The sheet S fed from the feed unit 10*a* is transported to the moisture sensor 31.

In step S1502, the CPU 1100 detects the amount of moisture using the moisture sensor 31. This is as described above with reference to FIG. 12.

In step S1503, the CPU 1100 adjusts the nip pressure (pressure amount) of the decurler 110 based on the detected amount of moisture.

Figure 16A:
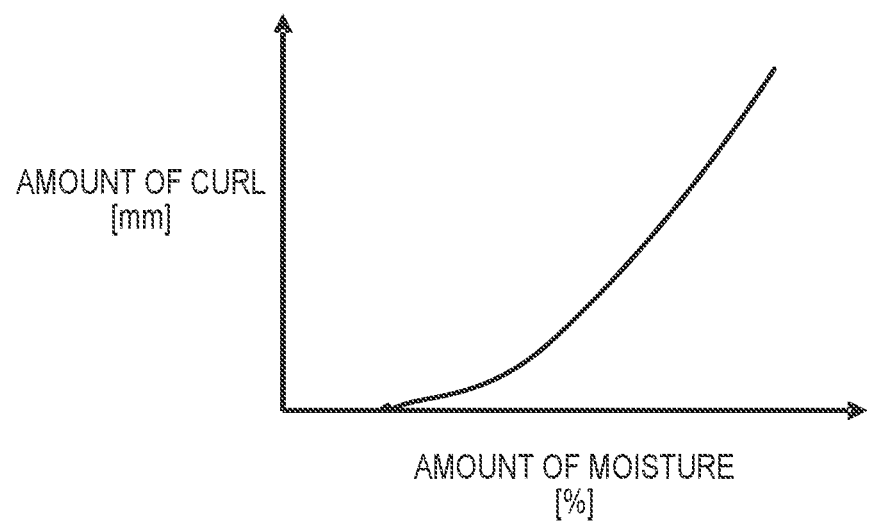
FIGS. 16A and 16B are diagrams illustrating a relationship between an amount of moisture and an amount of curl or a nip pressure required for a decurler.

FIG. 16A illustrates a relationship between the amount of moisture and the amount of curl produced in the sheet S. The greater the amount of moisture is before the sheet S passes through the fixer 52, the more moisture evaporates from the sheet S as a result of the sheet S passing through the fixer 52. In other words, the higher the amount of moisture, the higher the amount of curl. In order to properly correct curling, it is necessary to properly control the nip pressure of the decurler 110 in accordance with the amount of moisture.

Figure 16B:
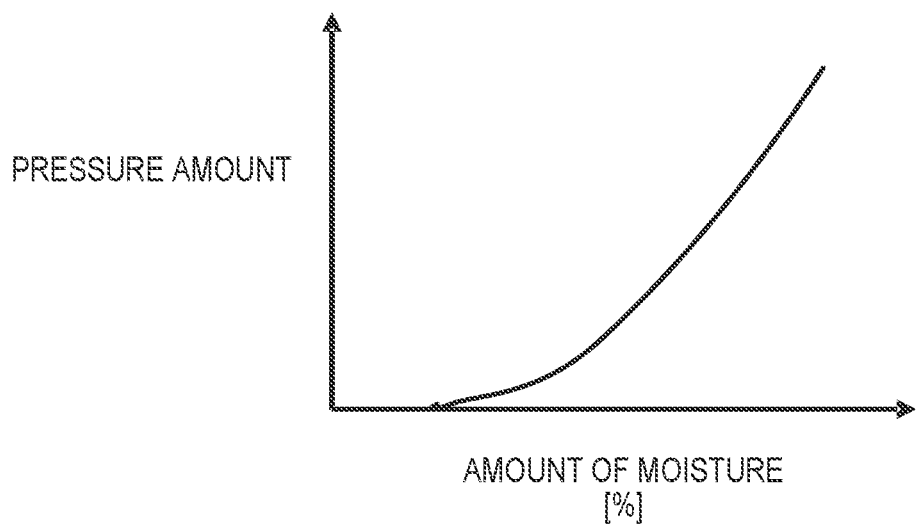

FIG. 16B illustrates the pressure amount of the correction rollers 111 and 114 in the decurler 110, corresponding to the amount of moisture. This relationship between the amount of moisture and the nip pressure (pressure amount) is held in the conversion table 1113. The nip pressure determination unit 1105 obtains the pressure amount corresponding to the amount of moisture detected by the moisture sensor 31 from the conversion table 1113. The decurler control unit 1106 drives the motors 1121 and 1124 such that the determined pressure amount is applied.

In step S1504, the CPU 1100 transfers the toner image from the intermediate transfer belt 40 to the sheet S at the secondary transfer nip T2. In step S1505, the CPU 1100 controls the fixer 52 and fixes the toner image onto the sheet S.

In step S1506, the CPU 1100 executes curl correction by causing the sheet S to pass through the decurler 110.

According to the present embodiment, the nip pressure of the decurler 110 is appropriately adjusted in accordance with the amount of moisture contained in the sheet S. As a result, the curl in the sheet S is corrected more appropriately.

Adjusting Secondary Transfer Voltage in Sheet Moisture Information

FIG. 17 illustrates a method for adjusting the transfer voltage (transfer current) at the secondary transfer nip T2 based on the amount of moisture. The CPU 1100 executes the following processing when a user instructs printing to be performed. Note that the difference between FIG. 17 and FIG. 15 is that step S1503 has been replaced with step S1700. Accordingly, step S1700 will be described in detail.

In step S1700, the CPU 1100 (the transfer voltage determination unit 1107) adjusts the transfer voltage based on the amount of moisture detected by the moisture sensor 31. The amount of toner transferred to the sheet S depends on the transfer current flowing from the outer roller 44 to the inner roller 43 via the sheet S. In other words, the transfer current has an appropriate target current. On the other hand, the amount of moisture in the sheet S changes the resistance value of the sheet S. Accordingly, when the transfer voltage is fixed, the transfer current cannot be controlled to the appropriate target current. For example, increasing the amount of moisture increases the resistance value and reduces the transfer current. Reducing the amount of moisture reduces the resistance value and increases the transfer current. Accordingly, the transfer voltage determination unit 1107 adjusts the transfer voltage based on the amount of moisture such that the transfer current becomes an appropriate target current.

According to the present embodiment, the transfer voltage is adjusted in accordance with the amount of moisture, and thus fluctuations in the transfer rate are suppressed. In other words, variations in the density and color of the toner image are reduced.

Technical Spirit Derived from Embodiments

The LED 401 is an example of a first semiconductor light-emitting element. The reflecting member 700 is an example of a first reflecting member. The PD 403 is an example of a light-receiving element. The CPU 1100 is an example of a determination circuit, a processor, or a controller. According to the present embodiment, the amount of moisture is determined based on a result of receiving light reflected by a sheet multiple times. In other words, the amount of moisture is detected based on reflected light that has been affected more by the amount of moisture in the sheet than in the past. Accordingly, minute changes in the amount of moisture in the sheet can be detected with greater accuracy than in the past.

Note that according to the present embodiment, the moisture sensor 31 having an advantage with respect to being smaller and lower in cost than in the past, as well as the image forming apparatus 1 equipped with the moisture sensor, may be provided. In particular, because a semiconductor light-emitting element is used, the moisture sensor 31 according to the present embodiment is made smaller in size compared to a moisture sensor that uses a tungsten light source or the like. Furthermore, an optical filter is omitted, which further reduces the size of the moisture sensor 31. Making the size smaller also lowers the cost. Note that the semiconductor light-emitting element may be a semiconductor light-emitting element of a type different type from an LED, such as organic EL (electroluminescence) or the like.

As described with reference to FIG. 7A and the like, the mirror surface of the reflecting member 700 may be curved. This makes it possible to focus the reflected light onto a part of the sheet S. This is considered to improve the accuracy of detecting the amount of moisture.

As illustrated in FIGS. 7A and 7B, the reflecting member 700 may have a dome. Using a dome shape makes it difficult for paper debris from the outside to enter, which improves the accuracy of detecting the amount of moisture.

As illustrated in FIG. 7A, the reflecting member 700 may be a hemisphere.

The opening 710a is an example of a first opening. The opening 710c is an example of a second opening. As illustrated in FIG. 7A, the emission surface of the semiconductor light-emitting element may be located inside the hemisphere. The plane of incidence of the light-receiving element may also be located inside the hemisphere.

The LED 402 is an example of a second semiconductor light-emitting element. The opening 710b is an example of a third opening. In this manner, a plurality of semiconductor light-emitting elements may be provided.

The LED 402 is an example of a second semiconductor light-emitting element. In this manner, a plurality of semiconductor light-emitting elements may be provided.

1,450 nm is an example of a peak light emission wavelength of the first semiconductor light-emitting element. 1,300 nm is an example of a peak light emission wavelength of the second semiconductor light-emitting element. In this manner, a plurality of first semiconductor light-emitting elements may be provided.

Some aspects are illustrated in FIG. 3. This can be useful in correcting the output value of the light-receiving element, with respect to the first semiconductor light-emitting element.

The first semiconductor light-emitting element and the second semiconductor light-emitting element may be exclusively turned on. This is as described above with reference to FIG. 12.

As described with reference to FIG. 12, the amount of moisture may be determined based on a first light reception result and a second light reception result. The first light reception result may be a light reception result obtained from the light-receiving element when the first semiconductor light-emitting element is turned on and the second semiconductor light-emitting element is turned off. The second light reception result may be a light reception result obtained from the light-receiving element when the first semiconductor light-emitting element is turned off and the second semiconductor light-emitting element is turned on The amount of moisture may be determined according to Formulas (1) to (3). Using statistical values reduces the effect of variations in the surface of the sheet S. Note that the controller may obtain the statistical values by performing statistical processing on calculated values obtained by dividing the first light reception result by the second light reception result, and determine the amount of moisture based on the statistical values.

The outer roller 44 and the secondary transfer nip T2 are an example of a transfer unit or roller. The fixer 52 is an example of a fixing device. The decurler 110 is an example of a reduction mechanism. The CPU 1100 and the motors 1121 and 1124 are examples of adjustment mechanisms.

The CPU 1100 and the transfer power source 1130 are an example of an adjustment circuit.

The transfer voltage may be adjusted according to the amount of moisture. This is as described above with reference to FIG. 17.

The feed units 10a and 10b include feed rollers. The transport path P1 is an example of a first transport path. The transport path P2 is an example of a second transport path. The merging part 21 is an example of a merge point. Disposing the moisture sensor 31 in such a position makes it possible to measure the amount of moisture of all sheets S moving toward the secondary transfer nip T2.

Some aspects are as described with reference to FIG. 9. The primary reflected light L1 is an example of diffusely-reflected light reflected only once by the sheet, and the secondary reflected light L2 is an example of the reflected light reflected at least twice by the sheet.

As illustrated in FIG. 10, the reflecting member 1000 is an example of a second reflecting member.

As illustrated in FIG. 10, the opening 1001 is an example of an opening provided in the second reflecting member.

As illustrated in FIG. 10, the first reflecting member and the second reflecting member may be disposed facing each other with the light-receiving element therebetween.

Some aspects are as described with reference to FIGS. 9 and 10.

Some aspects are as described with reference to FIGS. 7A, 7B, 9, and 10. This makes it difficult for regularly-reflected light to be incident on the light-receiving element.

The moisture sensor 31 is an example of a moisture detection device. Note that of Aspects 1 to 22, matters pertaining to the moisture sensor 31 can also be applied in some aspects.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-081724, filed May 18, 2022 which is hereby incorporated by reference herein in its entirety.

What is claimed is:

1. A moisture sensor that detects moisture in an object, the moisture sensor comprising:
a first light-emitting element configured to emit light;
a second light-emitting element configured to emit light from a direction different from the first light-emitting element;

a first reflecting member configured to:
  reflect light reflected from the object toward the object when the first light-emitting element emits the light; and
  reflect light reflected from the object toward the object when the second light-emitting element emits the light;
a light-receiving element configured to:
  receive light that is multiple reflected between the object and the first reflecting member when the first light-emitting element emits the light; and
  receive light that is multiple reflected between the object and the first reflecting member when the second light-emitting element emits the light; and
a controller configured to determine an amount of moisture in the object based on a light reception result from the light-receiving element.

2. The moisture sensor according to claim 1, wherein a reflective surface of the first reflecting member is curved.

3. The moisture sensor according to claim 1, wherein the first reflecting member includes a dome, and an inner surface of the dome is a reflective surface.

4. The moisture sensor according to claim 3, wherein:
the dome includes a first opening and a second opening,
the light emitted from the first light-emitting element passes through the first opening toward an inside of the dome, and
the light-receiving element receives light that is multiply reflected between the object and the first reflecting member through the second opening.

5. The moisture sensor according to claim 4, further comprising:
a second light-emitting element configured to emit light from a direction different from the first light-emitting element,
wherein the dome includes a third opening,
wherein the light emitted from the second light-emitting element passes through the third opening toward an inside of the dome,
wherein the inner surface of the dome reflects light reflected from the object when the first light-emitting element emits the light, and reflects light reflected from the object when the second light-emitting element emits the light, and
wherein the light-receiving element receives light that is multiple reflected in the inside of the dome.

6. The moisture sensor according to claim 1, wherein a peak light emission wavelength of the first light-emitting element is different from a peak light emission wavelength of the second light-emitting element.

7. The moisture sensor according to claim 1, wherein an attenuation rate of light of a peak light emission wavelength output from the first light-emitting element due to moisture is higher than an attenuation rate of light of a peak light emission wavelength output from the second light-emitting element due to moisture.

8. The moisture sensor according to claim 1, wherein the first light-emitting element and the second light-emitting element are exclusively tuned on.

9. The moisture sensor according to claim 1, wherein the controller determines the amount of moisture based on a first light reception result and a second light reception result, the first light reception result being a light reception result obtained from the light-receiving element when the first light-emitting element emits light and the second light-emitting element does not emit light, and the second light reception result being a light reception result obtained from the light-receiving element when the first light-emitting element emits light is turned off and the second light-emitting element does not emit light.

10. The moisture sensor according to claim 1, wherein:
the light-receiving element receives diffusely-reflected light reflected only once by the object, and
the controller is configured to determine the amount of moisture based on a light reception result from the light-receiving element having received (i) the diffusely-reflected light reflected only once by the sheet and (ii) reflected light that is multiple reflected from the object and the first reflecting member.

11. The moisture sensor according to claim 1, further comprising:
a second reflecting member configured to reflect light reflected from the object toward the object,
wherein the light-receiving element is further configured to receive light that is multiple reflected between the object and the second reflecting member.

12. The moisture sensor according to claim 11, wherein:
the second reflecting member includes an opening, and
the light emitted from the first light-emitting element passes through the opening toward the object.

13. The moisture sensor according to claim 11, wherein an angle formed by a normal direction of the first reflecting member and a normal direction of the sheet is different from an angle formed by a normal direction of the second reflecting member and the normal direction of the sheet.

14. The moisture sensor according to claim 1, wherein an angle formed by an incident angle of light output from the first light-emitting element on the object and a normal direction of a light-receiving surface of the light-receiving element is 45 degrees.

15. The moisture sensor according to claim 1, wherein a peak light emission wavelength of the first light-emitting element is 1450 nm.

16. The moisture sensor according to claim 1, wherein:
a peak light emission wavelength of the first light-emitting element is 1450 nm, and
a peak light emission wavelength of the second light-emitting element is 1300 nm.

17. An image forming apparatus that forms a toner image on a sheet, which is an object, the image forming apparatus comprising:
a moisture sensor configured to detect moisture in the object, and comprising:
  a first light-emitting element configured to emit light;
  a second light-emitting element configured to emit light from a direction different from the first light-emitting element;
  a first reflecting member configured to:
    reflect light reflected from the object toward the object when the first light-emitting element emits the light; and
    reflect light reflected from the object toward the object when the second light-emitting element emits the light; and
  a light-receiving element configured to:
    receive light that is multiple reflected between object and the first reflecting member when the first light-emitting element emits the light; and
    receive light that is multiple reflected between the object and the first reflecting member when the second light-emitting element emits the light;
a transfer roller configured to transfer the toner image onto the object based on a transfer voltage; and
a controller configured to:

determine an amount of moisture in the object based on a light reception result from the light-receiving element; and control the transfer voltage based on the determined moisture amount.

18. An image forming apparatus that forms a toner image on a sheet, which is an object, the image forming apparatus comprising:
   a moisture sensor configured to detect moisture in the object, and comprising:
      a first light-emitting element configured to emit light;
      a second light-emitting element configured to emit light from a direction different from the first light-emitting element;
      a first reflecting member configured to:
         reflect light reflected from the object toward the object when the first light-emitting element emits the light; and
         reflect light reflected from the object toward the object when the second light-emitting element emits the light; and
      a light-receiving element configured to:
         receive light that is multiple reflected between the object and the first reflecting member when the first light-emitting element emits the light; and
         receive light that is multiple reflected between the object and the first reflecting member when the second light-emitting element emits the light;
   a transfer roller configured to transfer the toner image onto the object;
   a heater configured to heat the toner image on the object;
   a reduction mechanism configured to reduce curling in the object caused by heating the object by the heater; and
   a controller configured to:
      determine an amount of moisture in the object based on a light reception result from the light-receiving element; and
      control the reduction mechanism based on the determined moisture amount.

* * * * *